Nov. 12, 1929.  H. E. ALTGELT  1,735,714
PLANTER
Filed Dec. 1, 1925  3 Sheets-Sheet 2
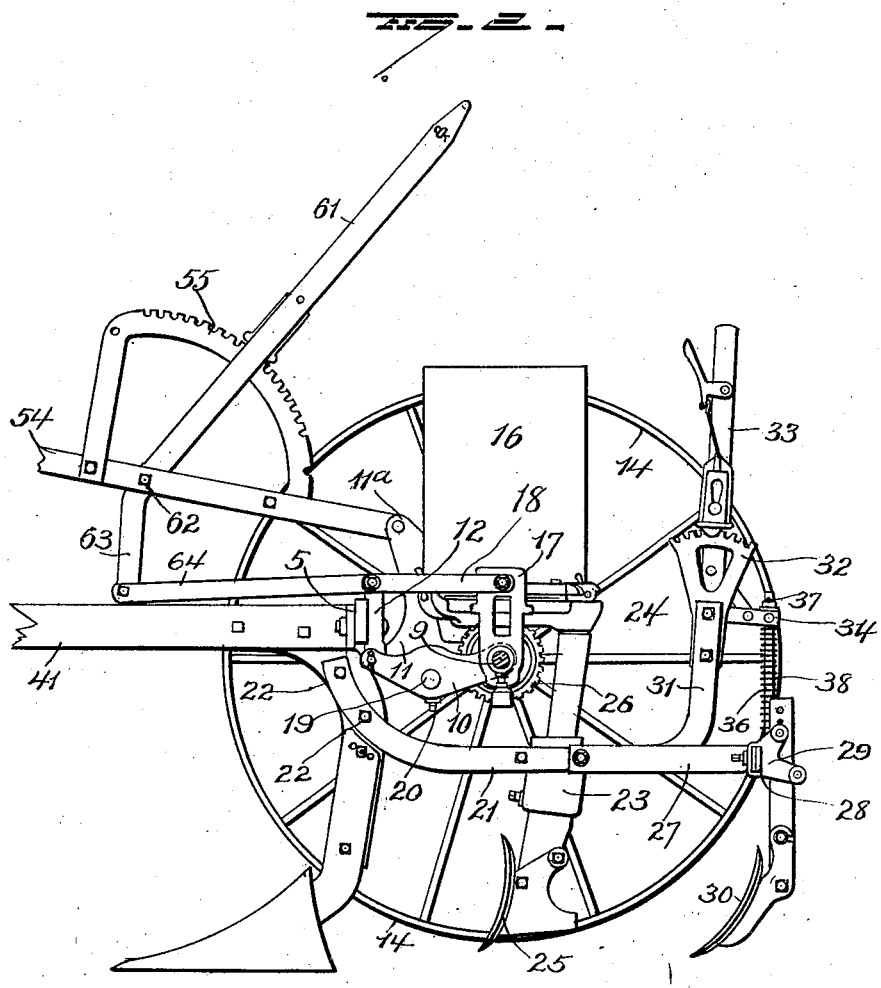

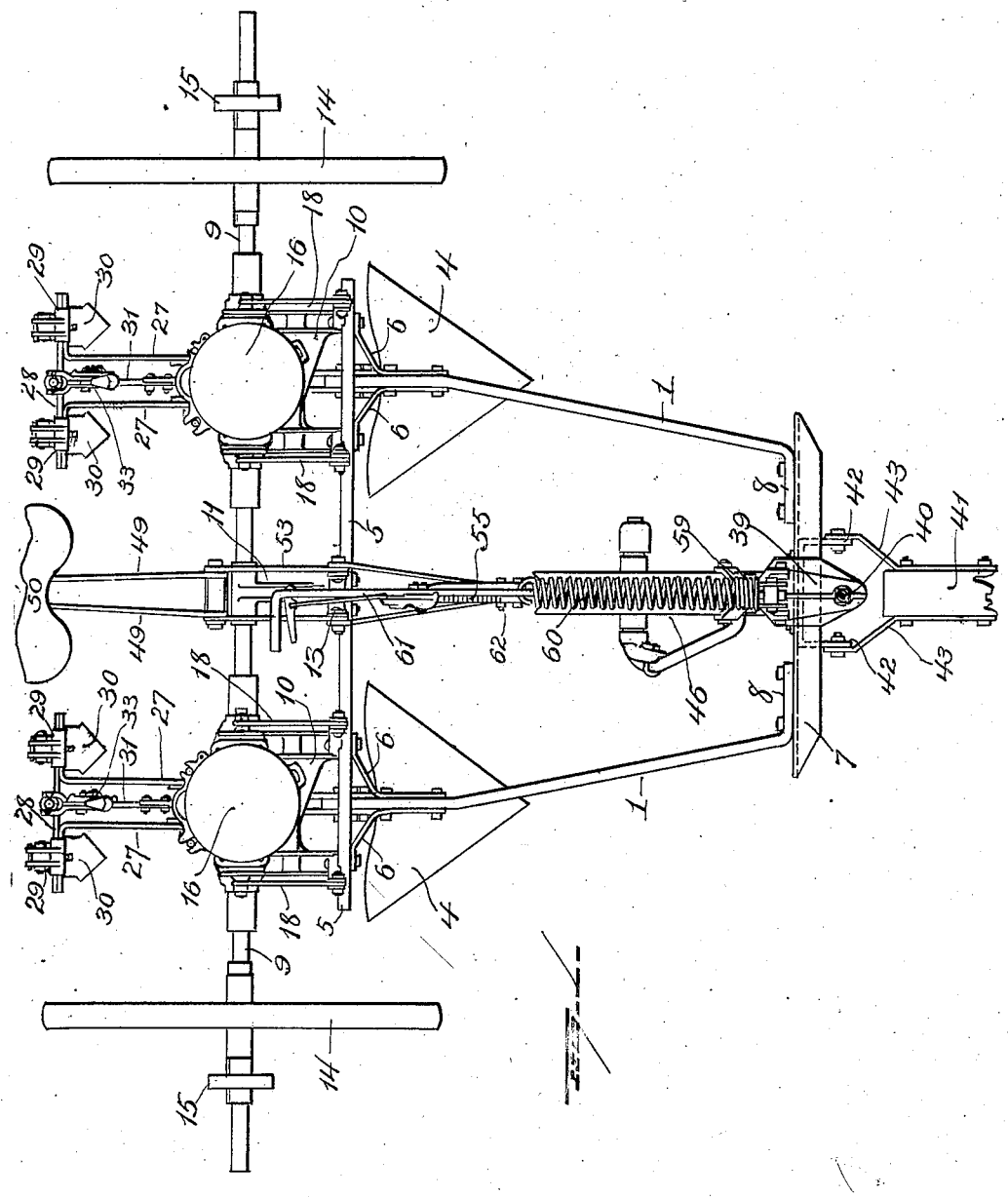

Nov. 12, 1929.  H. E. ALTGELT  1,735,714
PLANTER
Filed Dec. 1, 1925   3 Sheets-Sheet 3
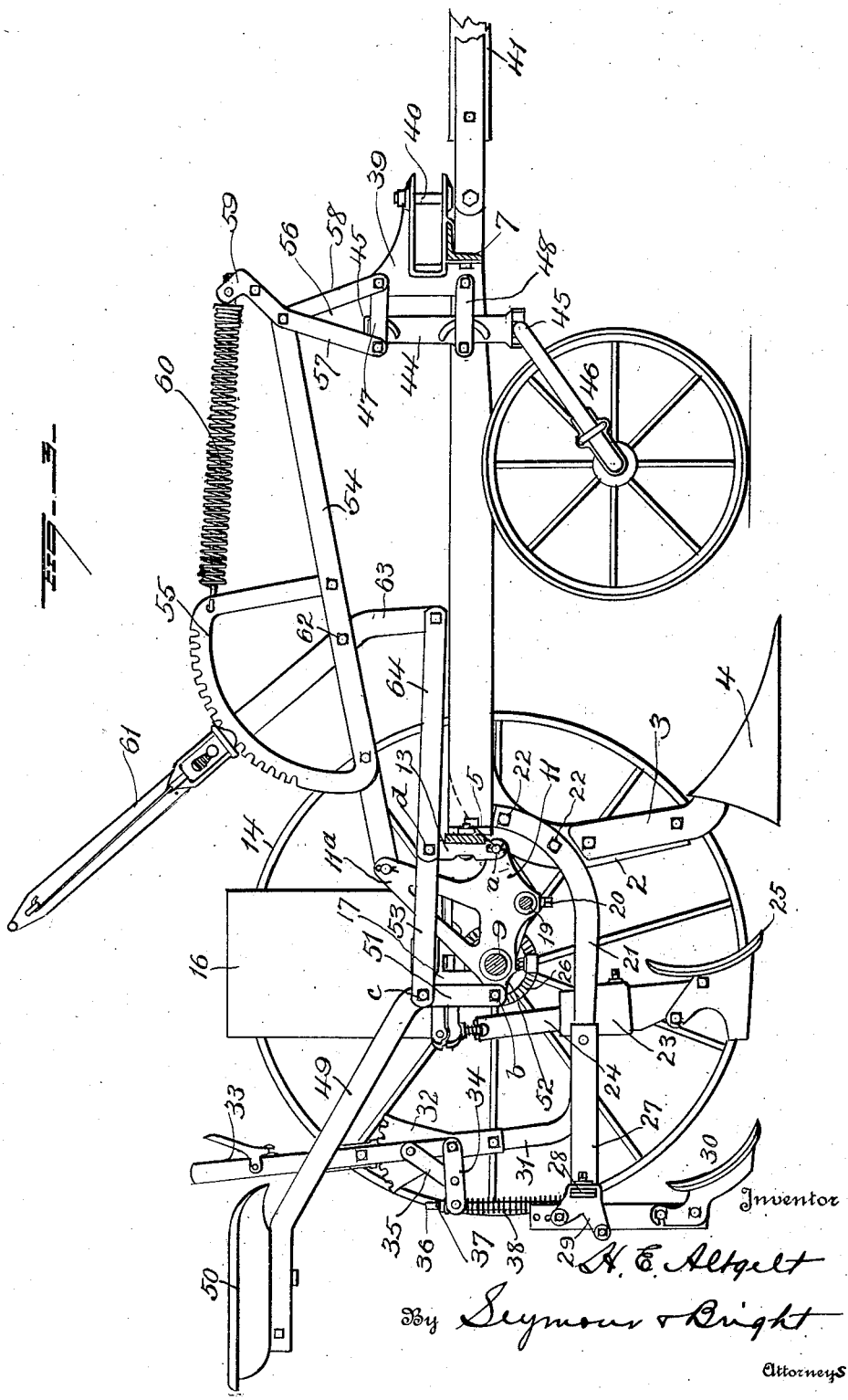

Patented Nov. 12, 1929

1,735,714

UNITED STATES PATENT OFFICE

HERMAN E. ALTGELT, OF SOUTH BEND, INDIANA, ASSIGNOR, BY MESNE ASSIGNMENTS, TO OLIVER FARM EQUIPMENT COMPANY, A CORPORATION OF DELAWARE

PLANTER

Application filed December 1, 1925. Serial No. 72,571.

This invention relates to improvements in planters and more particularly to those of the two-row type,—one object of the invention being to so construct a two-row planter that the same may be raised and lowered in such manner that the two seed cans and their bottom castings, as well also as the rider's seat, will be maintained in the same angular relation to the beams at all times.

A further object is to provide simple and efficient means whereby both ends of the structure may be raised or lowered simultaneously, so that the vertical movements of the frame and planting devices shall be substantially perpendicular to the surface of the ground.

With these and other objects in view, the invention consists in certain novel features of construction and combinations of parts as hereinafter set forth and pointed out in the claims.

In the accompanying drawings,—

Figure 1 is a plan view of a two-row planter embodying my improvements.

Figure 2 is a partial side elevation with the axle shown in section, and

Figure 3 is a longitudinal sectional view.

The frame of the planter comprises two beams 1—1 having standard portions 2 at their rear ends for the connection of the shanks 3 of plow bases or earth working elements 4; a rear transverse bar or beam 5 with which the plow beams are connected by means of brackets 6, and a front cross-bar or beam 7 which may be conveniently made of angle iron and to which the inwardly projecting arms 8 at the forward ends of the plow beams 1 are secured.

An axle 9 is located rearwardly of the frame and is flexibly connected with the latter by means of link castings 10 and 11,— the forward ends of the link castings 10 being pivotally connected with the rear cross-bar 5 through the medium of brackets 12 secured to said cross-bar, and the forward end of the link casting 11 being pivotally connected to said beam 5, centrally between the ends thereof, through the medium of a bracket 13 secured to said beam. Carrying wheels 14 are connected with the axle 9 through the medium of ratchet devices indicated conventionally at 15,—said ratchet devices being of any approved construction which will lock the wheels to the axle when the machine moves forwardly but permit free rotation of said wheels on the axle when the machine moves rearwardly. The seed cans 16 are located directly over the axle and the bottom castings for these seed cans (in which the feed mechanisms are located) are supported by means of brackets 17, mounted on portions of the link castings 10 through which the axle passes. The upper portions of the brackets or supports 17 are connected with the upper portions of the brackets 12 by means of pivoted links 18. Brackets 12 and 17, the link casting 10 and links 18 of each planter unit constitute a parallelogram,—this construction being substantially the same as disclosed in my co-pending application Serial No. 60,058. In order that the link castings 10 and 11 shall be properly united so as to be movable together and so that they will be kept in proper alignment, said link castings are connected by a transverse shaft 19 to which they are secured by means of set screws 20 as shown in Figs. 2 and 3.

Bars 21 are secured at their forward end portions to the beam 1 (or standard portion thereof) of each unit of the machine by means of bolts 22. The bars 21 extend in approximately a horizontal direction under the axle and have secured thereto a seed boot 23 with which a conveyor 24 communicates. Each seed boot may carry a soil engaging member 25. The seed feeding mechanism for the two units of the machine are driven from the axle 9 through the medium of suitable gearing (one of the gears being shown at 26 Figure 2) and the gears, such as 26, are connected with the axle through the medium of clutch devices which are opened by the bars 21 when the plows are raised, all as fully shown and described in my said co-pending application Serial No. 60,058. Links 27 are pivotally attached at their forward ends to the rearwardly extending bars 21 and the rear ends of said links are bent laterally and secured to a cross-bar 28. The said cross-bar and the laterally projecting portions of the link 27 have secured thereto brackets 29 which carry coverer shovels 30. A standard 31 is secured to the boot 23 of each unit and is located between the links 27. Each standard carries a toothed segment 32 with which a hand lever 33 is connected,—each hand lever being provided with a rearwardly projecting arm 34. Each arm 34 may have a pivotal connection coincident with that of the hand lever 33 and connected with the latter by a link 35 as shown in Figure 3. Each arm 34 is bifurcated for the accommodation of a rod 36 which is provided above said arm with a collar or cotter pin 37. The lower end of each rod 36 is connected with the corresponding cross-bar 28 and between said cross-bar and arm, 34, a spring 38 is located on rod 36.

At the forward end of the planter, a casting 39 is rigidly secured to the central portion of the front frame bar 7 and is adapted to receive the main bar of an evener (not shown) which latter is connected with said casting by means of a pin 40. In advance of this casting, the rear end of the pole 41 is located and said pole is connected with respective arms of a U-bracket 42 secured to the frame bar 7, by means of brackets 43 which are rigidly secured to said pole 41 and pivotally connected with the arms of the U-bracket 42. The forward end of the frame is therefore pivotally connected with the pole and it will be understood that the forward end of the pole will have a loose connection with the harness of the draft animals.

Located a short distance in rear of the front frame bar 7 and casting 39, is a vertically disposed sleeve 44 which constitutes a bearing for the vertical axle 45 of a front carriage 46 on which the forward end portion of the planter structure is supported. In the drawings, this carriage is shown as having a single wheel but it will be understood that two wheels suitably spaced apart may be employed. The bearing sleeve 44 is connected with the casting 39 through the medium of upper and lower pairs of links 47 and 48,—said links being pivotally connected at their forward ends with the casting 39 and pivotally connected at their rear ends with the bearing sleeve 44.

The centrally located link member 11 is in effect a bell-crank. At its forward end the member 11 is pivotally connected with the lower portion of bracket 13 and near its rear end it is mounted on the axle 9. A support 49 for a seat 50 is provided at its forward end with a depending arm 51, the lower end of which is pivotally connected with a rearwardly extending portion 52 of the member 11. The upper portion of the arm 51 has pivoted thereto the rear ends of links 53, the forward ends of which latter are pivotally connected with the upper portion of the bracket 13. In the drawings, the seat support is shown as comprising two members and it will be understood that each of these members is provided with a depending arm 51 so that one of the links 53 is connected with one of these arms and the other link 53 with the other depending arm. By this parallelogram construction, formed by the connections at the points $a$, $b$, $c$ and $d$, the seat 50 is kept at the same angle relative to the beams of the planter whether the latter is in a raised or a lowered position.

The upwardly projecting arm 11$^a$ of the casting or bell-crank 11, has pivotally connected therewith the rear end of a bar 54. The bar 54 extends forwardly and carries a toothed segment frame 55 and the forward end of said bar is connected with a bell-crank structure 56 comprising pairs of links 57, 58 and 47. The pairs of links 57 and 58 are pivotally connected together at their upper portions coincident with the pivotal connection of the bar 54 with said bell-crank structure 56 and the links 57 are extended above such pivotal connection to provide arms 59 with which the forward end of a spring 60 is connected,—the rear end of said spring being connected with the segment frame 55 as shown in Fig. 3. A hand lever 61 is pivoted to the bar 54 at the base of the segment frame 55 as indicated at 62,—said hand lever carrying a suitable detent for cooperation with the teeth of the segment. The hand lever 61 depends from its pivotal support and thus provides a depending lever arm 63 which has pivoted thereto the forward ends of links 64, the rear ends of the latter being pivotally connected with the upper portions of the bracket 13 on the cross-beam 5.

It will be observed that when the lever 61 is pushed to the forward notch of the segment 55, the machine will be in a lowered or planting position and that when said lever is pulled to the rear notch of the segment, the machine will be in its raised position. It will also be noticed that the lifting spring 60 becomes stretched as the machine is being lowered to the ground and that its two connecting points become closer together when the machine is raised. The spring 60 therefore acts as a balance against the weight of the planter and to assist the operator when he is manipulating the lever.

Various changes might me made in the details of construction without departing from the spirit of my invention or limiting its scope.

Having fully described my invention what I claim as new and desire to secure by Letters Patent, is:

1. In a planter, the combination with a frame and a wheeled axle, of means constituting a parallelogram connection between the rear part of the frame and wheeled axle, a carriage, means constituting a parallelogram connection between said carriage and the front part of the frame, and means cooperable with said parallelogram connections for raising and lowering the frame at both ends perpendicular to the ground.

2. In a planter, the combination with a frame and a wheeled axle, of means constituting a parallelogram connecton between the rear part of the frame and the wheeled axle, a carriage, means constituting a parallelogram connection between said carriage and the frame, and means connected with the frame and cooperable with said parallelogram connections for raising and lowering the frame at both ends perpendicular to the ground.

3. In a planter, the combination with a frame and a wheeled axle, of a lever connecting said frame and axle, a carriage, a vertically disposed bearing member for the axle of said carriage, a bracket at the forward end of the frame, upper and lower pivoted links connecting said bearing member with the bracket at the forward end of the frame, upwardly projecting links pivotally connected at their lower ends with said bracket and bearing member respectively and pivotally connected together near their upper ends, a bar connecting said lever with said connected links, a hand lever having pivotal connection with said bar and having a depending arm, and a link connecting said depending arm of the hand lever with the rear portion of the frame.

4. In a planter, the combination with a frame and a wheeled axle, of a lever connecting said frame and axle, a carriage, a vertically disposed bearing member for the axle of said carriage, a bracket at the forward end of the frame, upper and lower pivoted links connecting said bearing member with the bracket at the forward end of the frame, upwardly projecting links pivotally connected at their lower ends with said bracket and bearing member respectively and pivotally connected together near their upper ends, a bar connecting said lever with said connected links, a hand lever having pivotal connection with said bar and having a depending arm, a link connecting said depending arm of the hand lever with the rear portion of the frame, a segment carried by said bar for cooperation with said hand lever, and a lifting spring between the upwardly projecting connected links and said segment.

5. In a planter, the combination with a frame and a wheeled axle, of a bell-crank lever connecting said frame and axle, elements constituting a parallelogram connection between the axle and the rear part of the frame, a carriage, elements constituting a parallelogram connection between the carriage and the front part of the frame, a bell-crank connection between said carriage and the frame, a bar connected with the bell-crank lever betwen the frame and axle and with said bell-crank connection, a hand lever pivoted to said bar, and a connection between said hand lever and the rear portion of the frame.

6. In a planter, the combination with a frame and a wheeled axle, of a bell-crank lever connecting said frame and axle, a parallelogram connection between the axle and the rear part of the frame, a carriage, in parallelogram connection between the carriage and the front part of the frame, a bell-crank connection between said carriage and the frame, a bar connected with the bell-crank lever between the frame and axle and with said bell-crank connection, a hand lever pivoted to said bar, a connection between said hand lever and the rear portion of the frame, a member projecting from said bar, and a lifting spring between said projecting member and said bell-crank connection.

7. In a two-row planter, the combination with a frame, and a wheeled axle, of link structures connecting the frame adjacent the sides thereof with the wheeled axle, a bell-crank structure connecting an intermediate portion of the frame with the wheeled axle, a shaft passing through said link and bell-crank structures and secured thereto, and lifting means connected with said bell-crank structure.

In testimony whereof, I have signed this specification.

HERMAN E. ALTGELT.